(12) United States Patent
Seagle et al.

(10) Patent No.: US 7,133,253 B1
(45) Date of Patent: Nov. 7, 2006

(54) POLE TIP WITH SIDES FLARED AT MEDIA-FACING SURFACE

(75) Inventors: David J. Seagle, Morgan Hill, CA (US); G. Vinson Kelley, San Jose, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 239 days.

(21) Appl. No.: 10/161,522

(22) Filed: Jun. 3, 2002

(51) Int. Cl.
G11B 5/147 (2006.01)
(52) U.S. Cl. .................................... 360/126
(58) Field of Classification Search ............. 360/126, 360/122, 121, 119, 317
See application file for complete search history.

(56) References Cited

U.S. PATENT DOCUMENTS

| | | | |
|---|---|---|---|
| 5,995,343 A * | 11/1999 | Imamura | 360/126 |
| 6,074,566 A | 6/2000 | Hsiao et al. | 216/2 |
| 6,088,197 A * | 7/2000 | Tsuda | 360/317 |
| 6,122,144 A | 9/2000 | Chang et al. | 360/122 |
| 6,137,652 A * | 10/2000 | Ezaki et al. | 360/317 |
| 6,163,442 A * | 12/2000 | Gill et al. | 360/317 |
| 6,170,150 B1 | 1/2001 | Ogata et al. | 29/603.2 |
| 6,207,466 B1 | 3/2001 | Kamijima | 438/3 |
| 6,282,056 B1 | 8/2001 | Feng et al. | 360/126 |
| 6,282,776 B1 | 9/2001 | Otsuka et al. | 29/603.14 |
| 6,337,783 B1 | 1/2002 | Santini | 360/317 |
| 6,381,093 B1 * | 4/2002 | Yoshida et al. | 360/126 |

* cited by examiner

Primary Examiner—Angel Castro
(74) Attorney, Agent, or Firm—Sawyer Law Group LLP; Jonathan E. Prejean, Esq.

(57) ABSTRACT

A thin film electromagnetic head has an inductive transducer with a ferromagnetic pole layer terminating adjacent a media-facing surface at a pole tip surface. The pole layer has side surfaces each having an end region that meets the pole tip surface, the end regions increasingly separated with increasing distance from the pole tip surface. Having a pole layer that is tapered to the point at which it meets the pole tip surface channels flux more efficiently for writing on-track as opposed to off-track. Such a tapered pole tip can be formed for a pair of pole layers separated by a submicron nonferromagnetic gap, or for a single perpendicular writing pole layer.

28 Claims, 12 Drawing Sheets

POLE TIP WITH SIDES FLARED AT MEDIA-FACING SURFACE

BACKGROUND OF THE INVENTION

The present invention relates to electromagnetic transducers, which may for example be employed in thin film inductive write heads of the type formed on the trailing ends of air bearing sliders used in magnetic recording disk drives.

An inductive transducer used for writing and/or reading magnetic information on storage media, such as a disk or tape, typically includes electrically conductive coil windings encircled by a magnetic core. The magnetic core has leading and trailing pole layers. The pole layers have pole tip surfaces adjacent to the recording media. The magnetic core is interrupted by a submicron nonmagnetic gap disposed between the pole tip surfaces to divert magnetic flux to the media during writing. To write to the media, electric current is flowed through the coil, which produces magnetic flux in the core encircling the coil windings, the magnetic flux fringing across the nonmagnetic gap adjacent to the media so as to write bits of magnetic field information in tracks on the recording media.

The first or leading pole layer is typically substantially flat, whereas the second or trailing pole layer is typically curved because a part of the second pole layer is formed over the coil windings and insulation disposed between the pole layers, while another part nearly adjoins the first pole layer adjacent the gap. The second pole layer may also diverge from a flat plane by curving to meet the first pole layer in a region distal to the media-facing surface, sometimes termed the back gap region, although a nonmagnetic gap in the core does not usually exist at this location.

Thousands of essentially identical inductive transducer heads are formed in a plurality of adjoining solid layers on a wafer substrate. After the layers have been formed on the wafer disk, the disk is cut into bars with a diamond blade, each bar containing many transducers. The sides of the bars, which have a plurality of layers exposed, are lapped to form smooth surfaces for facing recording media. The smooth media-facing surface is typically relieved by etching to improve the interaction of the media-facing surface with the media surface. A coating may be formed on the media-facing surface to protect the reading sensor of the read/write inductive transducer.

Figure 1A:
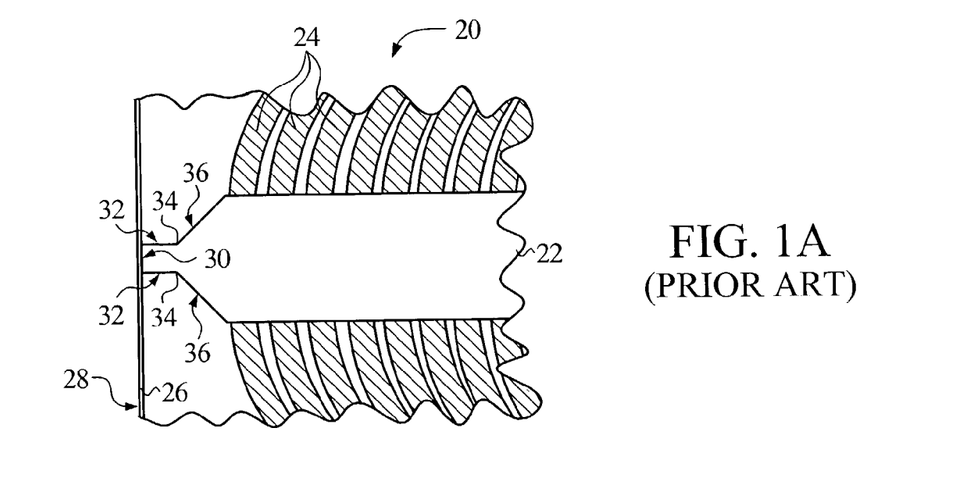
FIG. 1A (prior art) is a cutaway, opened-up view of a transducer portion of an information storage system.

An example of a prior art inductive transducer head 20 is shown in FIG. 1A, which depicts portions of the electromagnetic head. The electromagnetic head 20 has been formed in a plurality of adjoining solid layers on a wafer substrate. One of the layers is a trailing pole layer 22 that has been formed over an electrically conductive coil layer with coil sections 24. A protective coating layer 26 forms a media-facing surface 28. The trailing pole layer 22 meets the protective coating layer 26 at a trailing pole tip surface 30. As illustrated, the trailing pole layer 22 has sides 32 that are substantially parallel to each other near the trailing pole tip surface 30. A point at which the parallel sides 32 meet flared sides 36 is often termed a flare point 34.

The width of the pole tip surface 30, which corresponds to the track width, may be decreased to allow more tracks to be written on the recording media. As track width is decreased, however, it becomes more difficult to transmit high-intensity magnetic flux through the pole tip surface. A standard technique for increasing the strength of the magnetic field at the pole tip surface has been to increase the magnetic moment of the material near both the pole tip surface and the recording gap. One way to accomplish this is to form a pedestal of material having a high magnetic moment between a pole layer and the recording gap, increasing the magnetic field at the edge of the pole tip surface adjoining the gap.

Figure 1B:
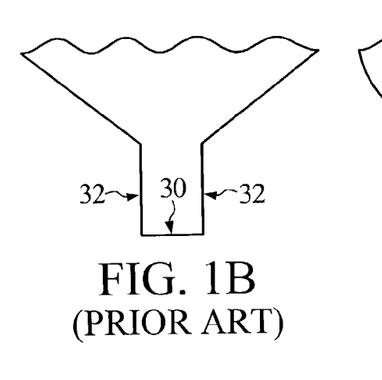
FIGS. 1B, 1C and 1D (each prior art) depict cutaway, cross-sections of pole layers, all of which have parallel sides immediately adjacent to the pole tip surface.
Figure 1C:
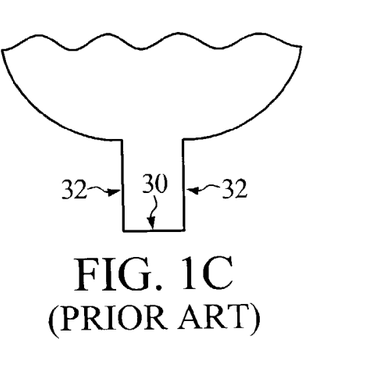
Figure 1D:
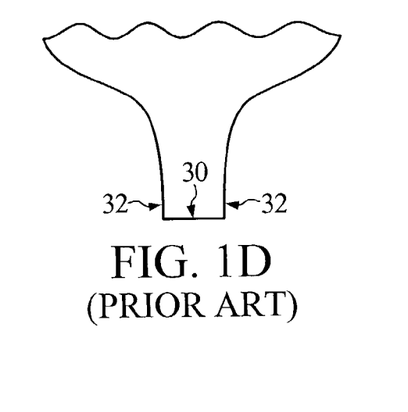

As noted above, the trailing pole layer and/or pedestal may have a flared or tapered width near the region around the pole tip surface in which the sides are parallel. Various geometries of tapered pole layers near the pole tip surface have been used, such as the geometries depicted in FIGS. 1B, 1C and 1D. In the cases of the tapered pole layers shown in FIGS. 1B, 1C and 1D, the sides 32 immediately adjacent to the pole tip surface 30 are parallel. The parallel sides 32 of the pole layer near the media-facing surface allow tolerance in the depth of lapping without affecting the track width.

U.S. Pat. No. 6,122,144 to Chang et al. states that it is possible to provide a tapered trailing pole layer that is much wider at an air bearing surface than the leading pole layer without the trailing pole layer broadening the track written to the media. Chang et al. also state that this tapering somehow solves a problem of off track writing by corners of the trailing pole tip.

SUMMARY

An inductive transducer is disclosed that has a tapered trailing pole tip with a track width that is not significantly greater than a track width of an associated leading pole tip, which may also have a tapered shape. Each of the ferromagnetic pole tips has a substantially flat face disposed adjacent to a media-facing surface with sides that are separated in the track width direction, with at least one of those sides meeting its face at an angle that is not perpendicular to the surface. A transducer having a tapered trailing pole tip has been found to provide increased magnetic flux directed on a desired media track compared to the flux directed to the media off that track, improving the density with which data can be written to the media. This summary merely lists a few aspects of the disclosure while the invention is defined by the claims appended below.

DETAILED DESCRIPTION OF THE PREFERRED EMBODIMENTS

Figure 2A:
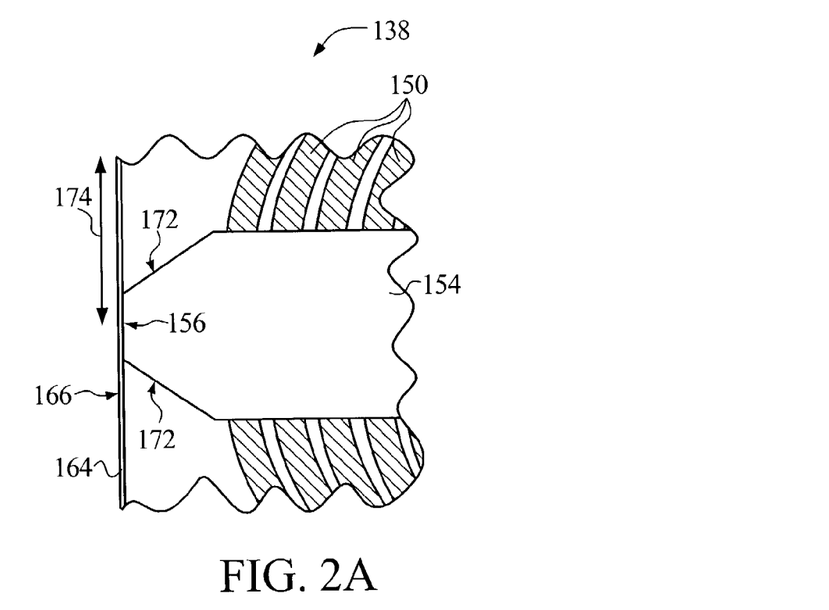
FIG. 2A is a cutaway, opened-up view of a transducer having a pole layer with sides that are flared beginning at the pole tip face.
Figure 2B:
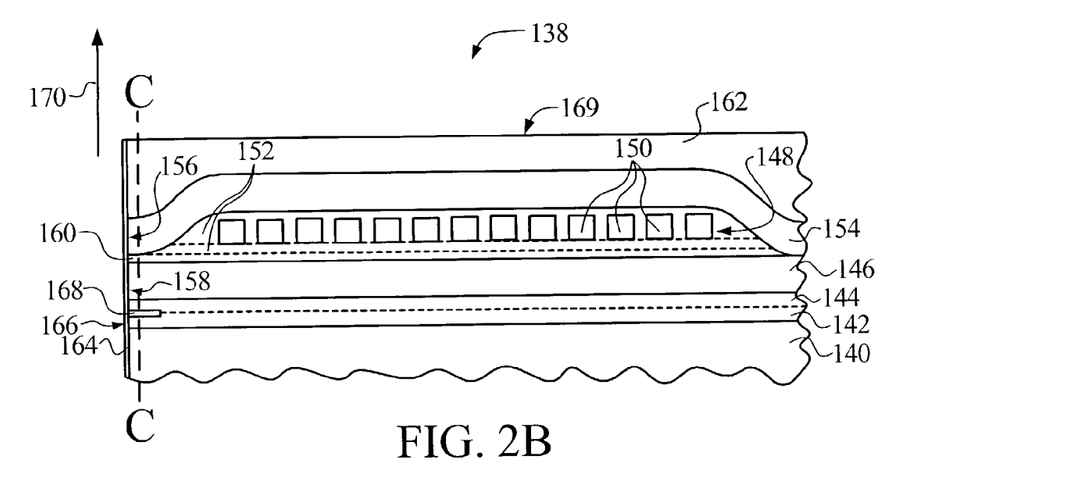
FIG. 2B is a cutaway, cross-sectional view of the transducer of FIG. 2A.

FIG. 2B depicts a first embodiment in accordance with the present invention and shows a cutaway cross-sectional view of a merged inductive and magnetoresistive (MR) transducer 138 of a read/write head. Transducer 138 has been formed in a plurality of adjoining solid layers on a wafer substrate, not shown. A first magnetically soft shield layer 140 has been formed adjacent to the wafer substrate. A first layer of nonmagnetic, electrically insulating material 142 is disposed on the shield layer 140, adjoining an MR sensor 168. The MR sensor 168 can be any sensor that utilizes a change in resistance associated with a change in magnetic field to sense that field, which may be measured as a change in current or voltage across the sensor, as the sensor passes over a track on a medium upon which information is stored.

A second layer of nonmagnetic, electrically insulating material 144 is disposed between MR sensor 168 and a second magnetically soft shield layer. The shield layer also serves as a first or leading pole layer 146 in this example of a merged read/write head.

An electrically conductive coil layer 148 has coil sections 150 that are separated from the leading pole layer 146 by additional nonmagnetic, electrically insulating material 152.

The coil sections 150 are substantially parallel in the cross-section shown, and coil layer 148 spirals about a magnetically soft back gap stud, not shown, extending away from a media-facing surface 166 in an area outside that shown in FIG. 2B. Additional coil layers may optionally be formed, for example, as shown in a third embodiment in FIG. 5.

A second or trailing pole layer 154 is curved to cover the insulating material 152 while also nearly adjoining the leading pole layer 146 adjacent to a media-facing surface 166. The trailing pole layer 154 is coupled to a back gap stud, not shown, so that leading pole layer 146, the back gap stud and trailing pole layer 154 form a magnetic loop substantially encircling and electrically isolated from coil sections 150. The pole layers have substantially planar surfaces 156 and 158 adjacent to the recording media. The leading pole tip surface 158 is separated from the trailing pole tip surface 156 by a submicron nonferromagnetic gap layer 160. A protective coating layer 162 forms a trailing end 169 of the body, while another protective coating layer 164 forms the media-facing surface 166.

The media-facing surface 166 is in close proximity to a relatively moving media, not shown, such as a spinning disk. The media is moving in a direction indicated by arrow 170, so that a leading end of the body encounters a portion of the moving media before the trailing end encounters that media portion.

FIG. 2A is a cutaway, opened-up view from above of a transducer 138, showing the coil sections 150 depicted with hash marks. Also shown are trailing pole layer 154, trailing pole tip surface 156, and protective coating 164 on the media-facing surface 166. Non-parallel, diverging sides surfaces 172 of the pole layers are shown that are substantially perpendicular to the submicron gap layer 160, but are not perpendicular to the media-facing surface 166. FIG. 2A does not contain a flare point, in contrast to FIG. 1A. Instead, the side surfaces 172 diverge from each other in a track width dimension 174 with increasing distance from the media-facing surface 166.

Figure 2C:
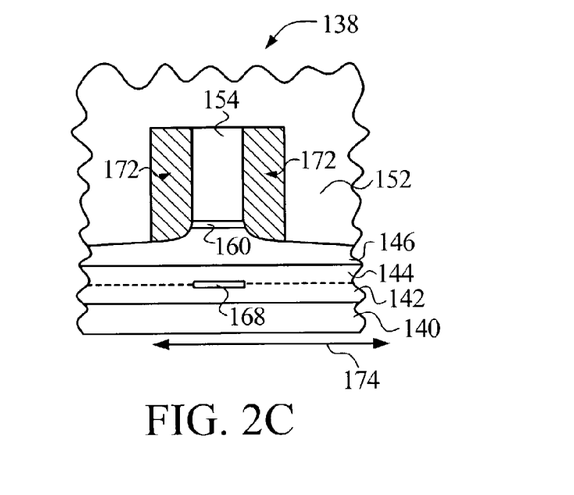
FIG. 2C is a cutaway, cross-sectional view of the transducer of FIG. 2A and FIG. 2B.

FIG. 2C is a cut-away, cross-sectional view from the media-facing surface of the transducer 138 taken along plane C—C of FIG. 2B. The non-parallel, diverging planar side surfaces 172 of the trailing pole layer 154 are depicted with hash marks.

Figure 2D:
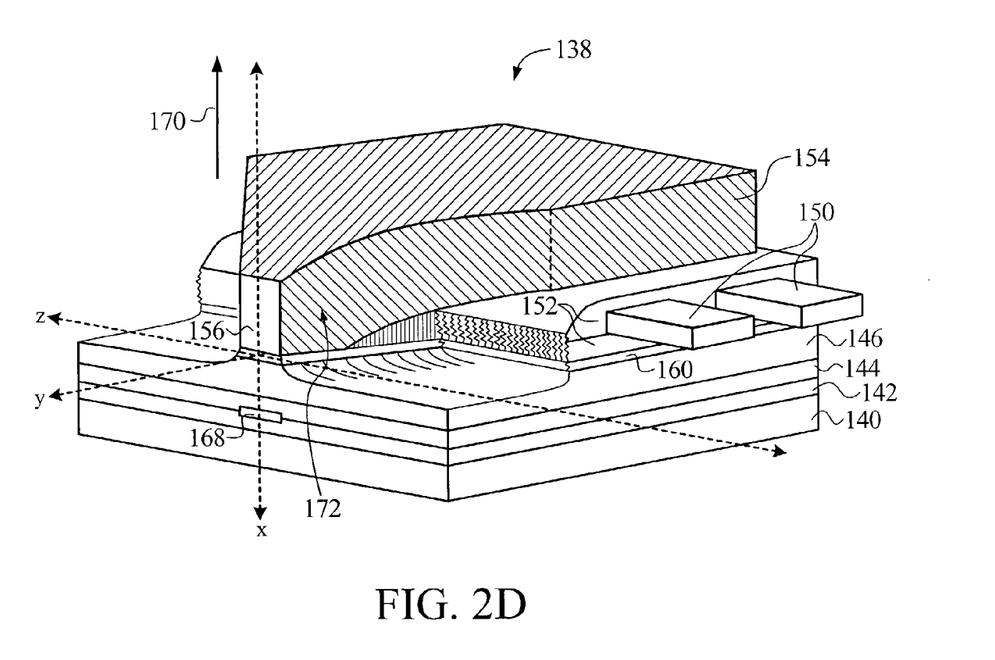
FIG. 2D is a schematic perspective view of the transducer of FIG. 2A, FIG. 2B and FIG. 2C.

FIG. 2D is a schematic perspective view of the transducer 138. One of the non-parallel, diverging sides 172 of the trailing pole layer 154 can be seen. FIG. 2D also indicates the direction 170 in which the recording media moves past transducer 138, which may be called a track-length or longitudinal direction. In addition, axes x, y and z are shown. The z axis lies on the media-facing surface, not shown in FIG. 2D, and along the track-width direction. The y axis is orthogonal to the media-facing surface and intersects the z axis. The x axis is perpendicular to both the z axis and the y axis and intersects both the z axis and the y axis. The longitudinal direction is parallel to the x axis.

A plane defined by x and y axes bisects the pole layers 146 and 154, and the intersection of the x, y and z axes lies on the media-facing surface and is centered over the submicron nonferromagnetic gap 160.

By forming side surfaces 172 that diverge from each other starting at the trailing pole tip surface 156 a larger field can be projected onto the on-track area of the recording media, holding other factors constant, such as the magnetic moment of the material at the area of the pole tip surface. For example, by creating the sides of the pole layer that flare immediately adjacent to the media-facing surface, a pole layer with material near its pole tip surface having a magnetic moment of 2.45 Tesla can be made to write with the intensity of a conventional pole layer with material near its pole tip surface having a magnetic moment of 2.9 Tesla.

In order to manufacture pole tip surfaces of specific track width for which the side surfaces of the pole layers near the pole tip surfaces are not parallel, lapping must be performed to a very tight tolerance. Although it is difficult to measure the total amount of material that has been lapped away from the pole layers, it is possible to measure how much material remains in the MR sensor. This is achieved by measuring the current or resistance across the MR sensor as material is lapped away from the media-facing surface of the MR sensor. By this method, the degree of lapping of the MR sensor can be measured down to a thickness of less than 25 nm from the media-facing surface, before the protective coating covers that surface.

By precisely aligning the pole layers and/or the pedestal, if any, with the MR sensor, it is possible to lap the media-facing surface of the pole tips by the precise amount required to achieve a desired track width. Precise alignment can be achieved by using a field alignment mark on the lowest layer. Masks for subsequently deposited layers are then always aligned to the same field alignment mark on the lowest layer so that misalignment errors are not compounded when each subsequent layer contains the alignment marks for the layer above.

Figures 3A, 3B, 3C, 3D, 3E:
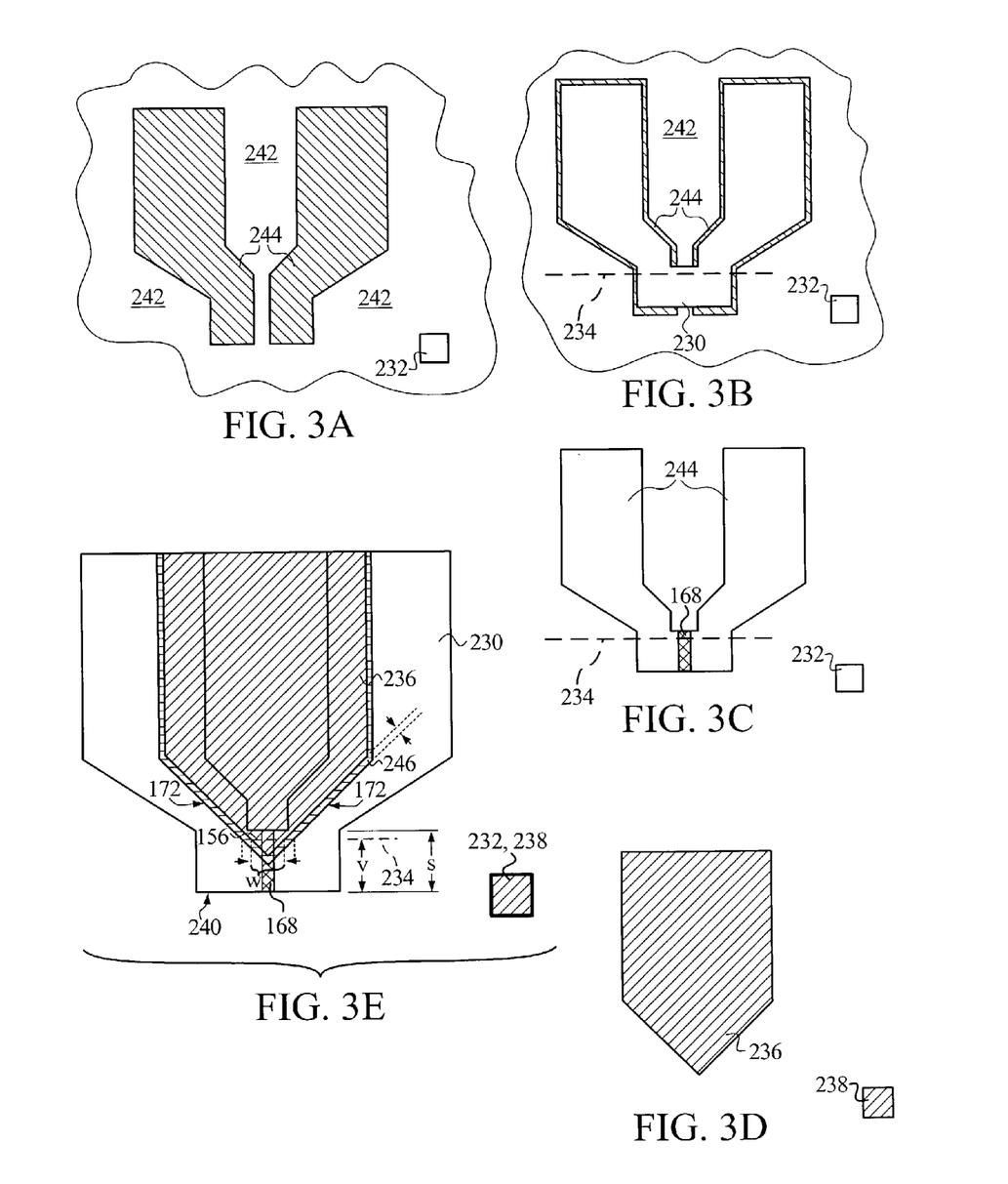
FIGS. 3A–E depict masks and alignment marks that enable lapping of the media-facing surface to a precise depth.

FIGS. 3A, 3B, 3C, 3D and 3E illustrate how precise lapping of a pole tip may be performed using alignment marks. FIG. 3A shows a cutaway top view of a step in the fabrication of an MR sensor. One or more MR sensor layers have been formed on a wafer, after a shield and read gap layer were formed. A mask has been created with openings disposed generally at 244, and the sensor layers removed by ion beam etching (IBE) in the openings, so that sensor layers remain intact in area 242. Magnetic bias and electrically conductive lead layers are then deposited in the openings and atop the mask, after which the mask is chemically removed and the layers atop the mask lifted off, leaving bias and lead layers 244 remaining where the mask had openings. The mask was aligned to an alignment mark 232 created in a region not used for active elements, such as a border area.

FIG. 3B shows a second mask 230 used to define a height in the y direction of the MR sensor layers 242 in a small region between the pair of leads 244, which may be called the stripe height. IBE has removed all parts of the leads 244 and the MR sensor layers 242 that were not covered by mask 230. What remains is the MR sensor 168 between two leads 244, as shown in FIG. 3C. After formation of various transducer layers on the wafer has been completed, the wafer is cut into heads that are polished while the resistance of the MR stripe is monitored. Line 234 indicates a plane at which the lapping is terminated.

Opaque layers may be restricted from the region around the alignment mark 232 for the mask 230 so that mark 232 is visible through subsequently deposited layers, for example, of $Al_2O_3$. For instance, the seed layer used to form trailing pole layer 154 can be removed to view the alignment mark 232. Alternatively, the alignment mark 232 can be left exposed during various processing steps so that it is available for aligning the pole layers.

Many manufacturing steps later, the stripe height defining mask can be repeated to just prior to creation of the trailing pole layer, to identify the line 234 at which the lapping will cease. Using such a line can help position a tapered trailing pole tip so that its track width is accurately defined after lapping.

After the lapping line 234 has been defined, the tapered trailing pole tip can be created by photolithography and electroplating. The photoresist opening 236 shown in FIG. 3D is made slightly larger than the desired pole tip size so that the trailing pole tip will be the correct size after IBE has been performed to remove the seed layer and optionally self-align the leading pole tip, because the IBE also removes part of the trailing pole tip. The mask used to create the photoresist opening 236 can be precisely aligned above the MR sensor 168 by aligning the alignment mark 238 above alignment mark 232 and the field alignment mark. FIG. 3E shows opening 236 for trailing pole layer 154 aligned above the MR sensor 168 and the two leads 244. The degree of lapping from the surface 240 can be controlled by measuring the current or resistance across the MR sensor material of remaining width s (the stripe height) between the leads. A trailing pole tip surface 156 of width w can be achieved by lapping away material for a distance v, thereby reaching plane 234, until a target resistance is reached.

The opening 236 for trailing pole layer 154 is aligned over the stripe height s to compensate for the amount by which the edges of trailing pole layer 154 are etched away when the seed layer is removed through ion beam etching (IBE). The final width w of the trailing pole tip surface 156 becomes smaller as material 246 is removed from the edges 172 of the trailing pole layer 154.

After the milling is nearly complete, the trailing pole layer and the line 234 can be further measured by scanning electron microscopy (SEM) or other techniques, to determine whether the track width of the pole layer will be correct after lapping. Based on the results of that determination, the pole layer may be milled a precise additional amount, so that the track width will be accurately formed.

An alternative method of manufacturing pole layers with side surfaces that are not parallel adjacent to the pole tip surfaces involves Focused Ion Beam (FIB) milling. This method does not require the precise alignment of the masks for various separate layers of the transducer. In this alternative method, after the trailing pole layer has been deposited on the lower layers, a FIB is directed onto the wafer, trimming sides of the pole layers so that the width of the pole layers increases immediately as the pole layers extend away from their pole tip surfaces.

Figure 4A:
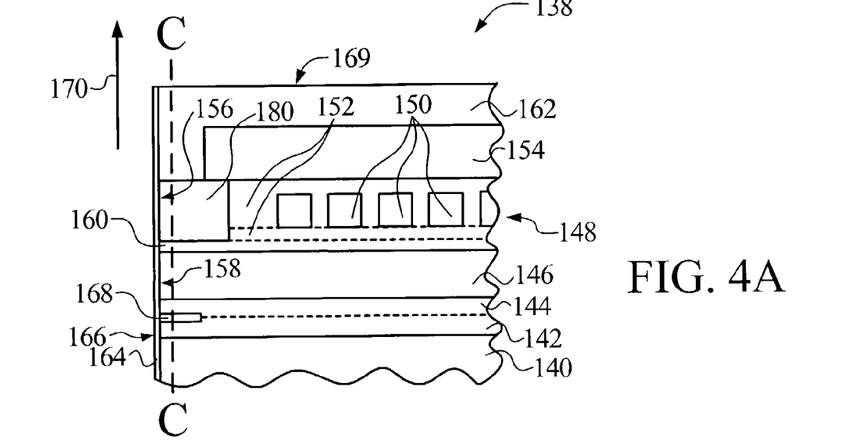
FIG. 4A is a cutaway, cross-sectional view of a transducer that includes a pedestal.

FIG. 4A depicts a second embodiment of the present invention. This embodiment includes a magnetically soft trailing pedestal 180 between the trailing pole layer 154 and the trailing pole tip surface 156. Trailing pedestal 180 is coupled to trailing pole layer 154, a back gap stud, not shown, and leading pole layer 146 to form a magnetic loop substantially encircling and electrically isolated from coil sections 150. The trailing pole tip surface 156 lies on the trailing pedestal 180 and is magnetically coupled to the leading pole tip surface 158; the two pole tip surfaces are separated by a submicron nonferromagnetic gap layer 160.

Figure 4B:
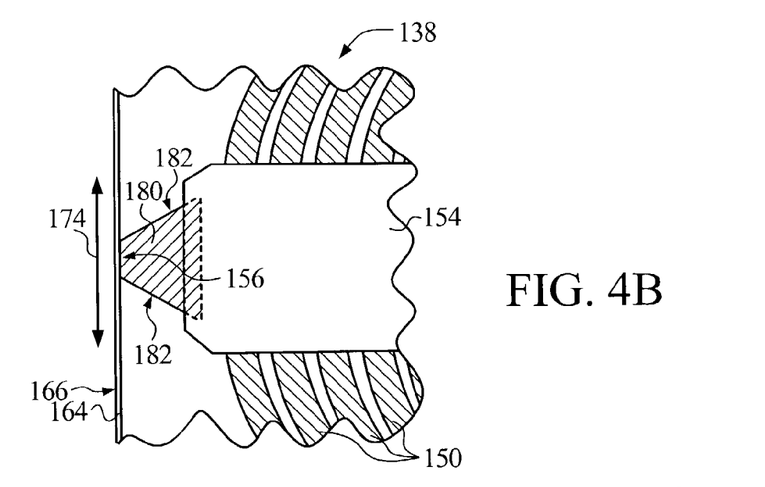
FIG. 4B is a cutaway, opened-up view of the transducer of FIG. 4A.

FIG. 4B is a cutaway, opened-up view of the transducer 138 of FIG. 4A showing the coil sections 150 depicted with hash marks. Non-parallel, diverging sides 182 of the trailing pedestal 180 are shown that are perpendicular to the submicron gap layer, but not to the media-facing surface. The sides 182 diverge from each other in the track width dimension 174 the farther they are from the media-facing surface 166.

Figure 4C:
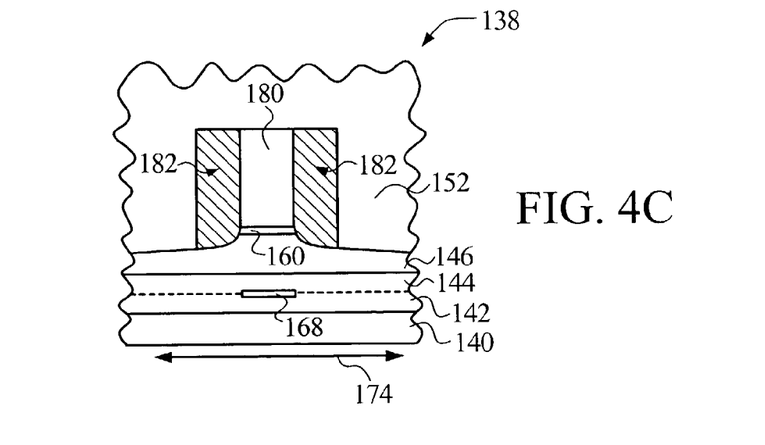
FIG. 4C is a cutaway, cross-sectional view taken along plane C—C of FIG. 4A.

FIG. 4C is a cut-away, cross-sectional view from the media-facing surface taken along plane C—C of FIG. 4A. The non-parallel, diverging sides 182 of the trailing pedestal 180 are depicted with hash marks.

Figure 5:
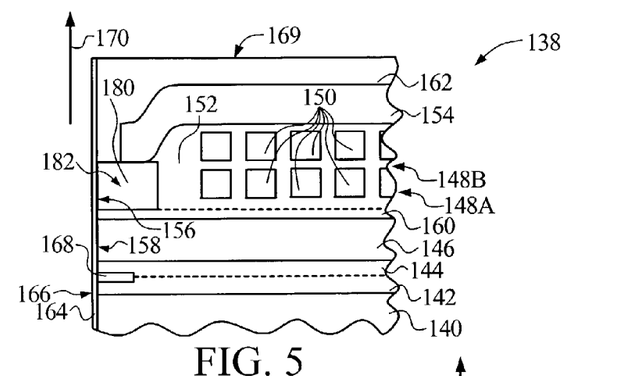
FIG. 5 is a cutaway, cross-sectional view of an inductive transducer with a pedestal adjoining a trailing pole layer, where the trailing pole layer is curved to cover two layers of coil windings and insulation disposed between the pole layers.

FIG. 5 shows a cutaway, cross-sectional view of a third embodiment of the present invention. Two electrically conductive coil layers 148A and 148B have coil sections 150 that are separated from the trailing pole layer 154 by additional nonmagnetic, electrically insulating material 152. One of the non-parallel, diverging sides 182 of the trailing pedestal 180, which is perpendicular to the submicron gap layer 160, but not to the media-facing surface 166, is shown.

Figure 6:
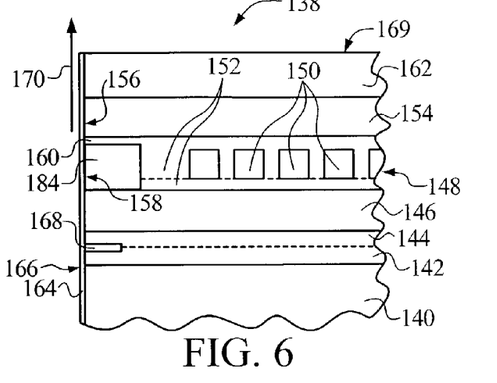
FIG. 6 is a cutaway, cross-sectional view of an inductive transducer with a pedestal adjacent to and in magnetic contact with a leading pole layer.

FIG. 6 depicts a cutaway, cross-sectional view of a fourth embodiment of the present invention. A magnetically soft leading pedestal 184 couples the leading pole layer 146 to a leading pole tip surface 158. Trailing pole tip surface 156 is magnetically coupled to leading pole tip surface 158, and the pole tip surfaces are separated by a submicron nonferromagnetic gap layer 160, which is filled with the nonmagnetic, electrically insulating material 152.

Figure 7:
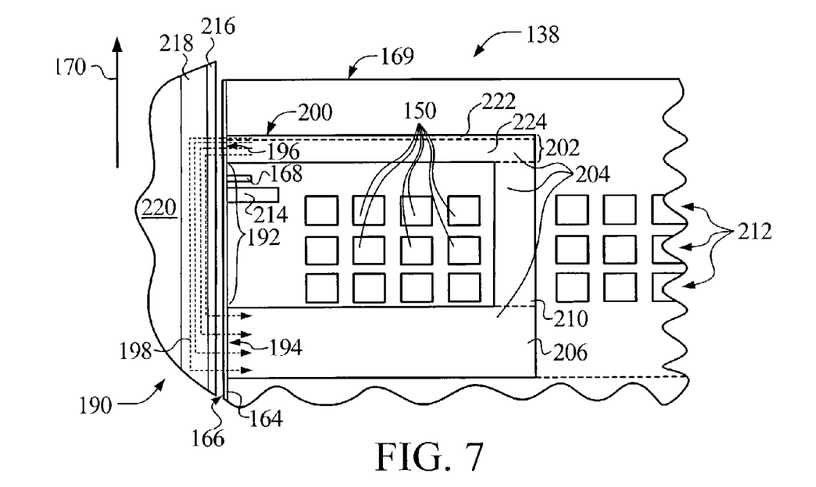
FIG. 7 is a cutaway, cross-sectional view of an inductive transducer in which a gap between a leading pole tip surface and a trailing pole tip surface is at least several times larger than the distance between a media-facing surface of the inductive transducer and a recording media.

The embodiments depicted in FIGS. 2B, 4A, 5 and 6 all have submicron gap layers 160, over which leading pole tip surface 156 is magnetically coupled to trailing pole tip surface 158. This produces a primarily longitudinal magnetic recording field that is parallel to the recording media at the point at which information is written onto the recording media. A fifth embodiment is depicted in FIG. 7, which is a cutaway cross-sectional view of a transducer 138 designed for perpendicular recording on a recording media 190. A gap distance 192 between a leading pole tip surface 194 and a trailing pole tip surface 196 is considerably wider than the submicron gap layers 160 in FIGS. 2B, 4A, 5 and 6, so that the magnetic flux 198 of the recording field is perpendicular to the recording media 190 at the point adjacent to the trailing edge 200 of the trailing pole layer 202 at which information is written onto the recording media.

The transducer 138 has a generally U-shaped ferromagnetic core 204 that includes a relatively large leading pole layer 206 through which magnetic flux is returned, a smaller trailing pole layer 202 through which the magnetic flux emanates that writes on the recording media 190, and a magnetic stud 210 that connects the pole layers 206 and 202. A conductive coil 212 including three layers in this embodiment winds around the magnetic stud 210. An MR sensor 168 is disposed adjacent a media-facing surface 166 between a magnetically soft shield layer 214 and the trailing pole layer 202. In this design, the media-facing surface 166 lies on a thin protective coating layer 164 that protects the MR sensor 168 from damage and corrosion.

The recording media 190 may be a disk or tape, for example, which includes a media layer or layers 216 disposed atop a magnetically soft underlayer 218, which in turn is disposed atop a substrate 220. The underlayer 218 and core 204 form a circuit or loop for magnetic flux 198 that writes information on the media layers 216. The recording media 190 moves past the transducer 138 as shown by arrow 170, so that the leading pole layer 206 encounters a portion of the recording media before the trailing pole layer 202. The MR sensor 168 can read magnetic bits that have been written on the recording media 190.

The trailing pole layer 202 in this fifth embodiment includes a first sublayer 222 that has been formed primarily by electroplating, and a second sublayer 224 that includes an atomic concentration of iron that exceeds 50%. In this type of perpendicular head, the magnetic flux 198 is concentrated adjacent to the relatively small trailing pole layer 202 that writes and is spread out adjacent to the relatively large leading pole layer 192 through which flux is returned to the ferromagnetic core 204. The trailing edge 200 of the trailing pole layer 202 is the last magnetic element encountered by the recording media 190 that moves past the transducer 138.

Having a magnetically soft, high magnetic saturation sublayer 224 disposed at the trailing edge 200 of the trailing pole layer 202 allows concentrated magnetic flux 198 adjacent to that sublayer 224 to leave a sharp and lasting magnetic pattern on the recording media 190.

Furthermore, the strength of the writing magnetic flux 198 can be increased by making the sides of the trailing pole layer 202 and its sublayers 222 and 224 diverge and widen immediately as the pole layer extends away from the thin protective coating layer 164 or, if no thin protective coating layer 164 is used, starting immediately as the sides of the trailing pole layer extend away from the media-facing surface 166.

Figure 8A:
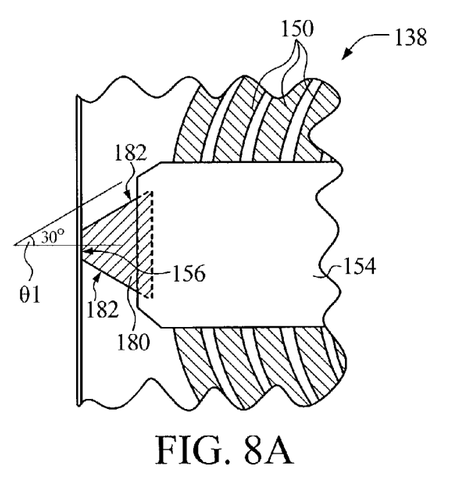
FIGS. 8A and 8B are cutaway, opened-up views of an inductive transducer similar to that shown in FIG. 4A, with planar side surfaces of the pedestal of the trailing pole layer widening from the trailing pole tip surface each at an angle θ from perpendicular to the media-facing surface.
Figure 8B:
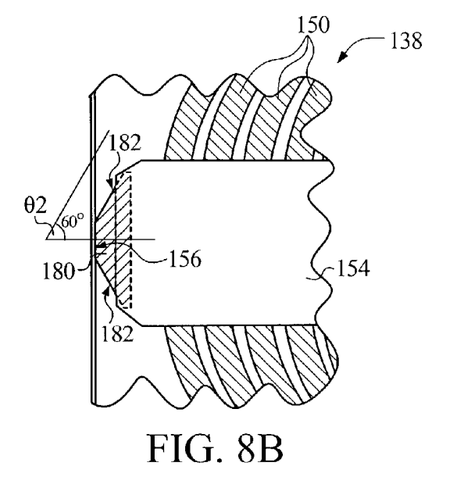

FIGS. 8A and 8B are cutaway, opened-up views of different embodiments of the transducer 138 of FIG. 4A. In FIG. 8A, the trailing pedestal 180 has planar side surfaces 182 that widen from the trailing pole tip surface 156 each at an angle θ1 of 30 degrees from perpendicular to the media-facing surface, which is also 30 degrees from the y axis in FIG. 2D. In FIG. 8B, the side surfaces 182 widen from the trailing pole tip surface 156 each at an angle θ2 of 60 degrees from perpendicular to the media-facing surface.

Figure 9:
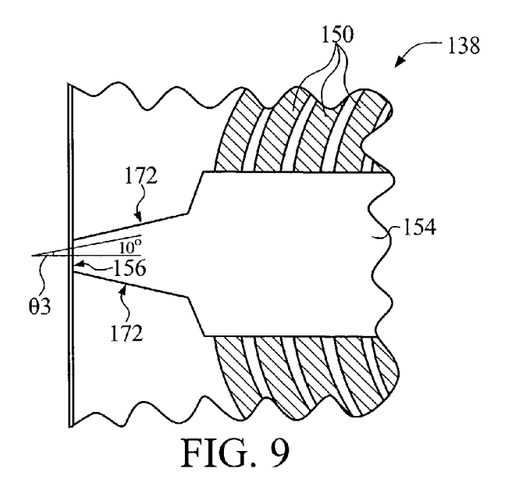
FIG. 9 is a cutaway, opened-up view of an inductive transducer that does not include a pedestal similar to that shown in FIG. 2B, with planar side surfaces of the trailing pole layer widening from the trailing pole tip surface each at an angle from perpendicular to the media-facing surface.

FIG. 9 is an cutaway, opened-up view from above of the transducer 138 similar to that shown in FIG. 2A, which lacks a pedestal. The trailing pole layer 154 has planar side surfaces 172 that widen from the trailing pole tip surface 156 each at an angle θ3 of 10 degrees from perpendicular to the media-facing surface.

Figure 10A:
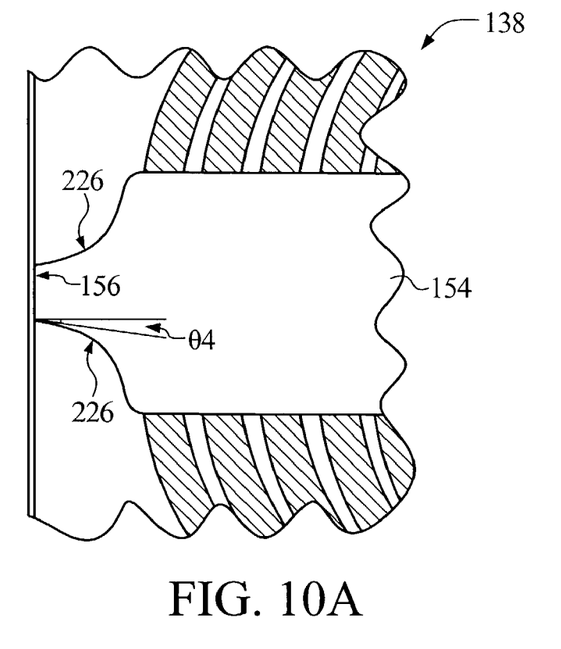
FIGS. 10A and 10B are cutaway, opened-up views of an inductive transducer similar to that shown in FIG. 2B that does not include a pedestal, with non-planar side surfaces of the trailing pole layer widening from the trailing pole tip surface each at an angle from perpendicular to the media-facing surface.
Figure 10B:
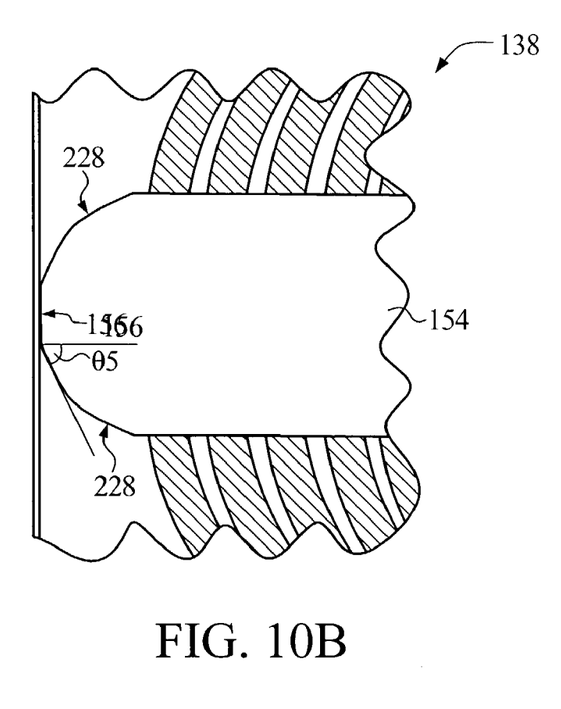

FIGS. 10A and 10B are opened-up views from above of the transducer 138 similar to that shown in FIG. 2A, which lacks a pedestal. The trailing pole layer 154 has non-planar side surfaces 172 that widen immediately from the trailing pole tip surface 156. In FIG. 10A, the concave side surfaces 226 meet the trailing pole tip surface 156 at non-perpendicular angles. The depicted angle θ4 is the angle from perpendicular to the media-facing surface and is not zero in FIG. 10A. In FIG. 10B, the convex side surfaces 228 meet the trailing pole tip surface 156 at an obtuse angle θ5.

Figure 11:
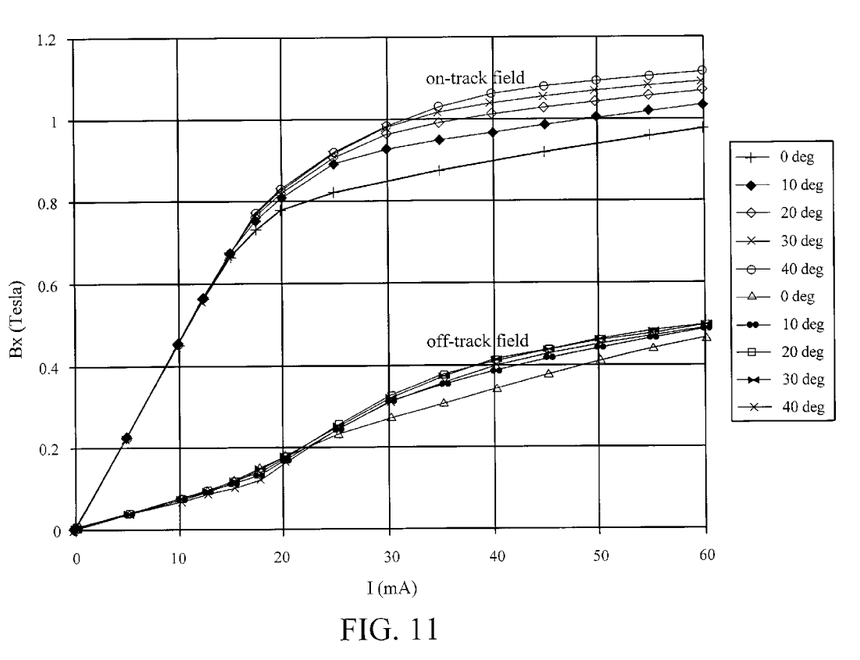
FIG. 11 is a graph of the point of write-saturation in Tesla at various currents for on-track and off-track fields.

FIG. 11 is a graph of the write fields in Tesla at various currents for on-track and off-track fields achieved by transducers with pole layers having sides oriented at various angles relative to perpendicular to the media-facing surface. The on-track field is measured from the point: x=0, y=−250 Å, z=0. Regardless of pole tip geometry, at low currents (below about 20 mA) the pole tips do not saturate, and increasing the write current through the coil sections increases the on-track magnetic field without significantly increasing the off-track magnetic field. Above about 20 mA, however, the pole tips begin to saturate, and increasing the write current produces a smaller proportionate increase in the on-track field, as seen by the flatter on-track curve above 30 mA.

The on-track field of a transducer having pole sides that each diverge 40° from perpendicular saturates at a significantly higher level than the saturation level of a conventional transducer with pole sides that are 0° from perpendicular. Moreover, when the write current is increased beyond about 20 mA, the off-track field increases at a higher rate than it does below 20 mA. Assuming that an on-track field of approximately 1 Tesla is desirable to write on most recording media, while an off-track field below about 0.4 Tesla is desirable to avoid risking adjacent track erasure, FIG. 11 indicates that for a given current of about 40 mA, the on-track field can be increased to above 1 Tesla without increasing the off-track field above about 0.4 Tesla solely by flaring the sides of the pole layers to an angle between 20 and 40 degrees from perpendicular to the media-facing surface.

Figure 12:
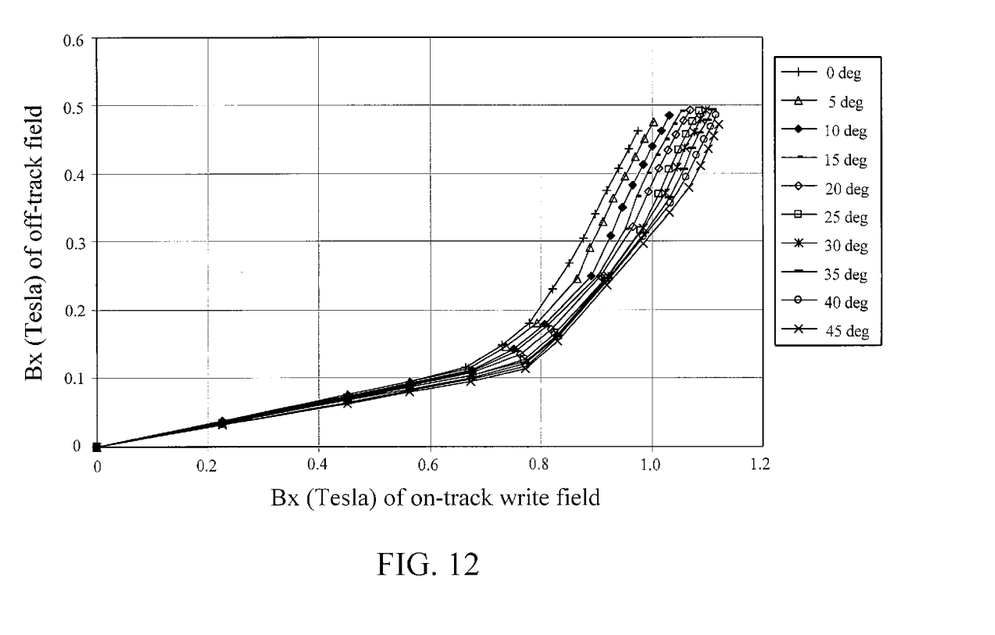
FIG. 12 is a graph of the same experimental data as in FIG. 11, except that the current has been eliminated as a parameter.

FIG. 12 shows similar experimental data as in FIG. 11, except that the current has been eliminated as a parameter. The on-track field is compared directly to the off-track field achieved by transducers with pole layers having sides oriented at various angles relative to perpendicular to the media-facing surface. Each curve represents the on-track and off-track fields produced by pole tips with sides flared at the named angles as the current is varied. With a larger flare angle at a given current, the on-track write field increases more than the off-track erase field increases, thereby moving the knee of the curves representing higher flare angles to the right.

Figure 13:
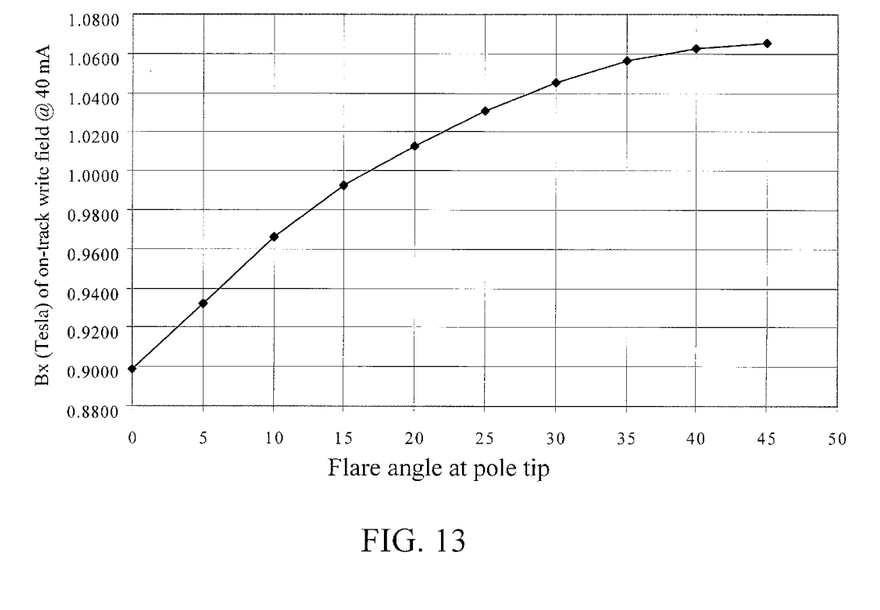
FIG. 13 is a graph of the strength of the magnetic field projected onto the recording media surface for a pole tip of constant width at various flare angles.

FIG. 13 is a graph of the strength of the on-track write field for a pole tip of constant width at various flare angles. The on-track field is measured from the point: x=0, y=−250 Å, z=0. It shows that up to about 45 degrees, with constant current in the coil sections, a larger flare angle increases the on-track write field. Above 45 degrees, the on-track write field increases only minimally with further increases in flare angle. Minimal increases in on-track field, however, are obtained by increasing the flare angle as far as 60 degrees.

Figure 14:
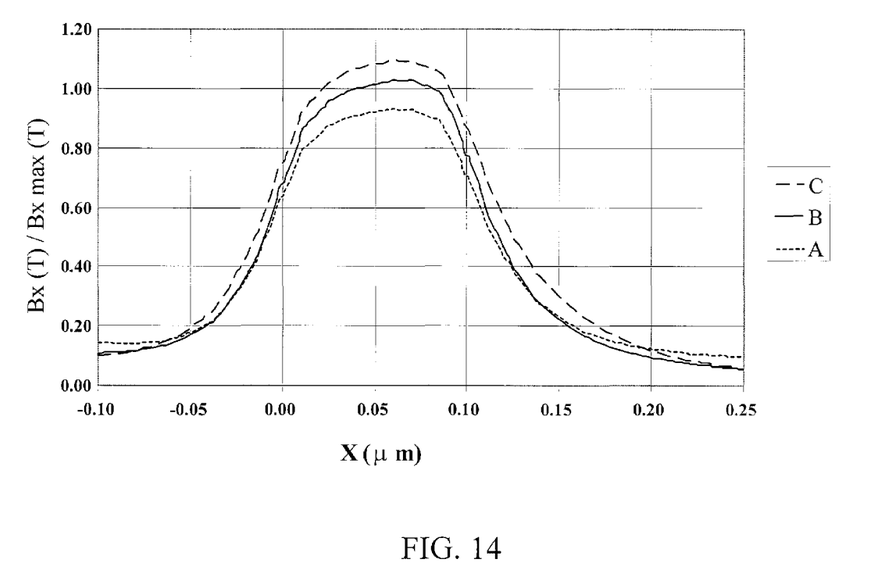
FIG. 14 compares the on-track write field of 3 hypothetical pole tips at various distances down the recording track (along the x axis). The pole tips differ by their magnetic moment and their flare angles.

FIG. 14 compares the on-track write field of three hypothetical pole tips at various distances down the track (along the x axis) relative to a center of the write gap. Design A is a pole tip with parallel sides made of material exhibiting a magnetic moment of 2.45 Tesla. CoFe alloys can be used to make pole tips with magnetic moments in excess of 2.4 Tesla. Design B is a pole tip with parallel sides made of material exhibiting a magnetic moment of 2.9 Tesla, although no material with such a high magnetic moment is yet known. Finally, design C is a pole tip with sides that flare at an angle of 45 degrees from the pole tip surface and that is made of material exhibiting a magnetic moment of 2.45 Tesla. The graph shows that design C, with flared sides and existing high-moment material, produces a larger on-track write field than the field produced by a pole tip with parallel sides made of hypothetical 2.9 Tesla material.

Although the present invention is described in connection with specific embodiments for instructional purposes, the present invention is not limited thereto. The terms leading and trailing are relative to one another and are otherwise not limiting. The side surfaces of the pole layers at the pole tips need not be planar surfaces in order to flare at non-perpendicular angles from the media-facing surface and thereby improve the on-track write field. Accordingly, various modifications, adaptations and combinations of various features of the described embodiments can be practiced without departing from the scope of the invention as set forth in the following claims.

The invention claimed is:

1. A device comprising:
a solid body extending from a media-facing surface in a first direction, extending from a leading end to a trailing end in a second direction that is perpendicular to said first direction, and extending in a third direction that is perpendicular to said first and second directions;
an electrically conductive coil disposed in said body and including a plurality of adjacent coil sections oriented substantially parallel to each other; and
first and second ferromagnetic pole layers disposed in said body, each having a thickness of less than ten microns and separated from each other in said second direction, said first ferromagnetic pole layer having a substantially flat first face disposed adjacent to said media-facing surface and extending a first distance in said third direction, said second ferromagnetic pole layer having a substantially flat second face disposed adjacent to said media-facing surface and extending in said third direction a second distance not substantially greater than said first distance, said second face having first and second sides that are separated in said third direction, said first side meeting said second face at an angle between said first direction and said third direction, wherein said first and second sides each extend in a substantially straight line from said second face for a distance of at least one micron;
wherein said angle is in a range between twenty degrees and sixty degrees from said first direction.

2. The device of claim 1, wherein said second side meets said second face at a second angle between said first direction and said third direction, so that said first direction is approximately midway between said angle and said second angle.

3. The device of claim 1, wherein said angle is in a range between forty degrees and fifty degrees from said first direction.

4. The device of claim 1, wherein said first ferromagnetic pole layer has a substantially flat first pole face disposed adjacent to said media-facing surface and has first pole sides that are separated in said third direction, with at least on of said first pole sides meeting said first pole face at approximately said angle between said first direction and said third direction.

5. The device of claim 1, wherein said first and second ferromagnetic pole layers are separated from each other by a submicron nonferromagnetic gap.

6. The device of claim 1, wherein said first and second ferromagnetic pole layers are separated from each other adjacent said media-facing surface by plural microns of nonferromagnetic material.

7. The device of claim 1, wherein said first and second sides of the first ferromagnetic pole layer are formed by ion beam etching.

8. The device of claim 1, wherein said first distance is approximately equal to said second distance.

9. The device of claim 1, further comprising a magnetoresistive sensor disposed closer to said first ferromagnetic pole layer than to said second ferromagnetic pole layer.

10. The device of claim 1 wherein said range of said is between forty-five degrees and sixty degrees from said first direction.

11. The device of claim 1 wherein said range of said angle is between ninety degrees and one hundred twenty degrees from said first direction.

12. A device comprising:
a solid body having a leading end, a trailing end, and a media-facing surface, said solid body extending in a longitudinal direction from said leading end to said trailing end;
an electrically conductive coil disposed in said body and including a plurality of adjacent coil sections oriented substantially parallel to each other; and
a leading ferromagnetic pole layer and a trailing ferromagnetic pole layer, each having a thickness of less than ten microns, said leading pole layer having a leading face and said trailing layer having a trailing face, said leading and trailing faces being disposed adjacent to said media-facing surface, said trailing ferromagnetic layer having side surfaces each having an end region that meets said trailing face, said end regions being substantially parallel to said longitudinal direction but not parallel to each other, wherein said trailing face restricts a track width written by the device and said side surfaces each extending in a substantially straight line from said trailing face for a distance of at least one micron;

wherein at least one of said end regions extends from said trailing face at an angle from normal to said trailing face that is in a range between twenty degrees and sixty degrees.

13. The device of claim 12, wherein said leading pole layer has additional side surfaces that meet said leading face at additional end regions, said additional end regions being parallel to said longitudinal direction but not parallel to each other.

14. The device of claim 12, wherein said end regions are increasingly separated from each other with increasing distance from said trailing face.

15. The device of claim 12, wherein said leading and trailing faces are separated from each other by a submicron nonferromagnetic gap.

16. The device of claim 15, wherein said end regions are aligned in said longitudinal direction with end surface of said leading pole layer.

17. The device of claim 12, wherein said leading and trailing faces are separated from each other by plural microns of nonferromagnetic material.

18. The device of claim 12, wherein said end regions are formed by ion beam etching.

19. The device of claim 12, further comprising an additional ferromagnetic layer adjoining one of said leading and trailing ferromagnetic layers that extends a first distance from said media-facing surface, said additional ferromagnetic layer extending from said media-facing surface a second distance that is more than twice said first distance.

20. The device of claim 12, further comprising a magnetoresistive sensor that is disposed closer to said leading ferromagnetic layer than to said trailing ferromagnetic layer.

21. The device of claim 12 wherein said range of said angle is between forty-five degrees and sixty degrees from normal to said trailing face that is in a range between twenty degrees and sixty degrees.

22. A device comprising:
a solid body having a leading end, a trailing end, and a media-facing surface, said solid body extending in a longitudinal direction from said leading end to said trailing end;
a ferromagnetic leading pole layer having a thickness of less than ten microns; and
a ferromagnetic trailing pole layer having a thickness of less than ten microns, a substantially planar trailing pole tip surface disposed adjacent to said media-facing surface, a first side surface having a first end region meeting said trailing pole tip surface, and a second side surface having a second end region meeting said trailing pole tip surface, wherein said first and second end regions are separated from each other by a track width at said trailing pole tip surface and by an extent that increases with increased distance from said trailing pole tip surface, and said first and second side surfaces each extends in a substantially straight line from said trailing face for a distance of at least one micron;
wherein said first and second end regions diverge from one another at an angle as they extend away from the pole tip surface, and said angle is in a range between about 40 degrees and 120 degrees.

23. The device of claim 22, wherein said extent increases at a ratio to said distance, said ratio being in a range between about one-half and three.

24. The device of claim 22, wherein said first and second end regions diverge from one another at an angle as they extend away from said pole tip surface, and said angle is in a range between about 80 degrees and 100 degrees.

25. The device of claim 22, wherein said first and second end regions are formed by ion beam etching.

26. The device of claim 22, wherein said ferromagnetic leading pole layer has a leading pole tip surface disposed adjacent to said media-facing surface, and said leading and trailing pole tip surfaces are aligned with each other.

27. The device of claim 22, wherein said ferromagnetic leading pole layer has a leading pole tip surface separated from said trailing pole tip surface by a submicron nonferromagnetic layer, and said leading pole layer has sides that converge at the pole tip surface.

28. The device of claim 22, wherein said ferromagnetic leading pole layer has a leading pole tip surface separated from said trailing pole tip surface by plural microns of nonferromagnetic material, and said leading pole tip surface has an area that is at least one hundred times larger than that of said trailing pole tip surface.

* * * * *